V. LUPPERT & P. St. PIERRE.
Saws.
No. 141,939.
Patented August 19, 1873.
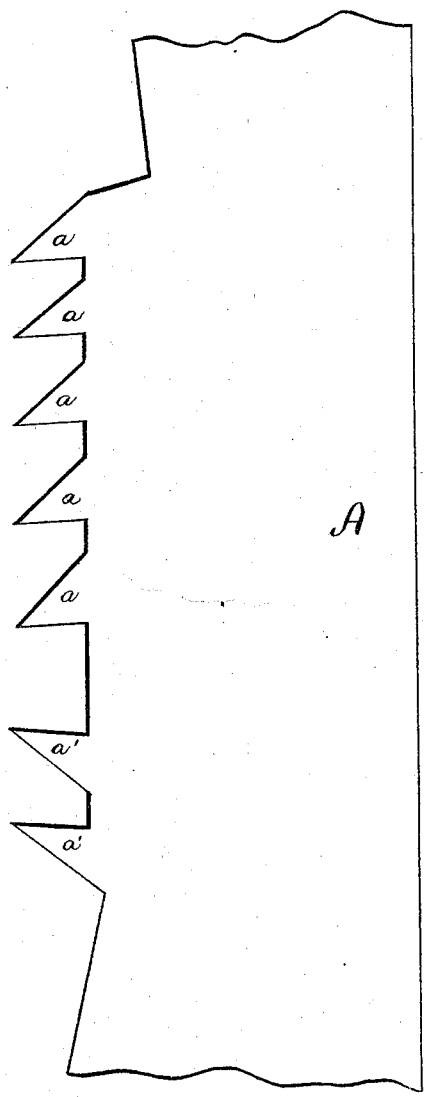

UNITED STATES PATENT OFFICE.

VALENTINE LUPPERT AND PETER ST. PIERRE, OF WILLIAMSPORT, PA.

IMPROVEMENT IN SAWS.

Specification forming part of Letters Patent No. 141,939, dated August 19, 1873; application filed September 5, 1872.

*To all whom it may concern:*

Be it known that we, VALENTINE LUPPERT and PETER ST. PIERRE, both of Williamsport, in the county of Lycoming and State of Pennsylvania, have invented a new Improvement in Saws; and we do hereby declare that the following is a full and exact description of the same, reference being had to the accompanying drawings and to the letters of reference marked thereon.

This invention consists in providing the lower end of a long mill-saw with reversed teeth, adapted to cut when the saw is moving upward, for the purpose of making a smooth cut on the lower edges of the lumber, and preventing them from being fractured or torn by the downward movement of the saw, as will be fully described hereinafter.

In the drawings, a view in elevation of our improved saw is shown.

To enable others skilled in the art to make and use our invention, we will proceed to describe fully its construction and operation.

A represents a saw-blade, provided with the usual series of teeth $a\ a\ a$, of any proper construction. $a'\ a'$ represent a certain number of reversed teeth, two or three being sufficient for the purpose, which are located at the extreme lower end of the cutting portion of the saw. The teeth $a'$ are made preferably longer than the teeth $a$, and are adapted to cut only when the saw is moving upward, the other teeth $a\ a$ being, of course, adapted to cut when the saw is moving downward.

The object of this construction is to prevent the lower edges of the lumber, as it is sawed, from being torn or fractured by the downward movement of the saw, as is frequently the case in practice, and this result is accomplished by the reversed teeth $a'\ a'$, which cut the lower edges of the lumber as the saw moves upward.

As these teeth $a'$ exceed in length the other teeth $a$, the lower edges of the lumber are always cut in advance of the other part, so that the danger of fracturing or tearing them is entirely removed.

These teeth $a'\ a'$ are not designed to cut the log proper, but only to sever the lower edges, and, being, consequently, few in number and located at the extreme lower end of the cutting portion of the saw, they exert no strain upon the saw in its upward movement, nor is there any tendency to lift the log from its carriage.

Having thus fully described our invention, what we claim, and desire to secure by Letters Patent, is—

The saw described, provided with the series of teeth $a\ a$ and the reversed teeth $a'\ a'$, the latter being located at the extreme lower end of the cutting portion, as and for the purpose described.

This specification signed and witnessed this 3d day of September, 1872.

VALENTINE LUPPERT.
PETER ST. PIERRE.

Witnesses:
C. D. BREWER,
D. C. ROBINSON.